March 15, 1960 C. M. HIRST, JR 2,928,292
BRAKE OPERATING OR SIMILAR MECHANISM
Filed March 9, 1959 5 Sheets-Sheet 4

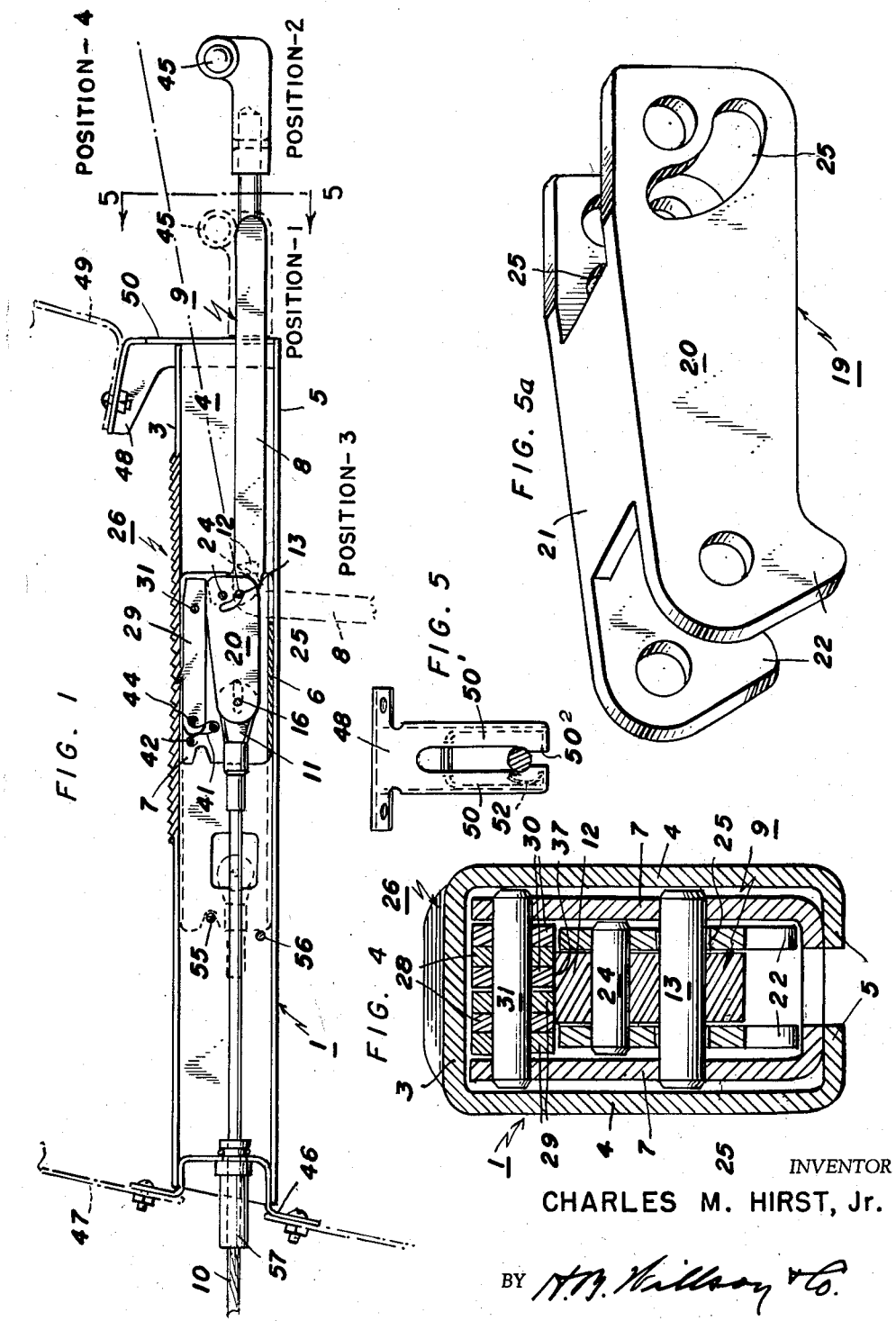

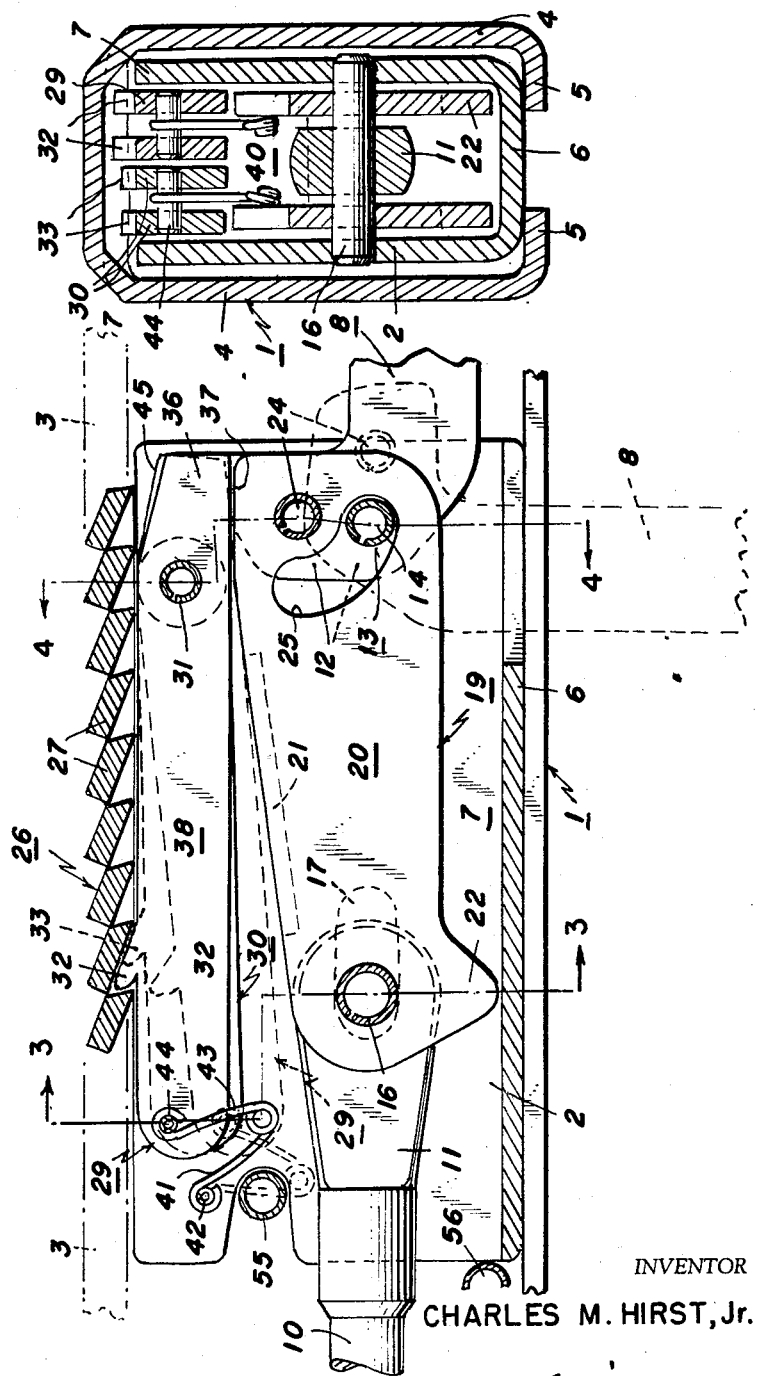

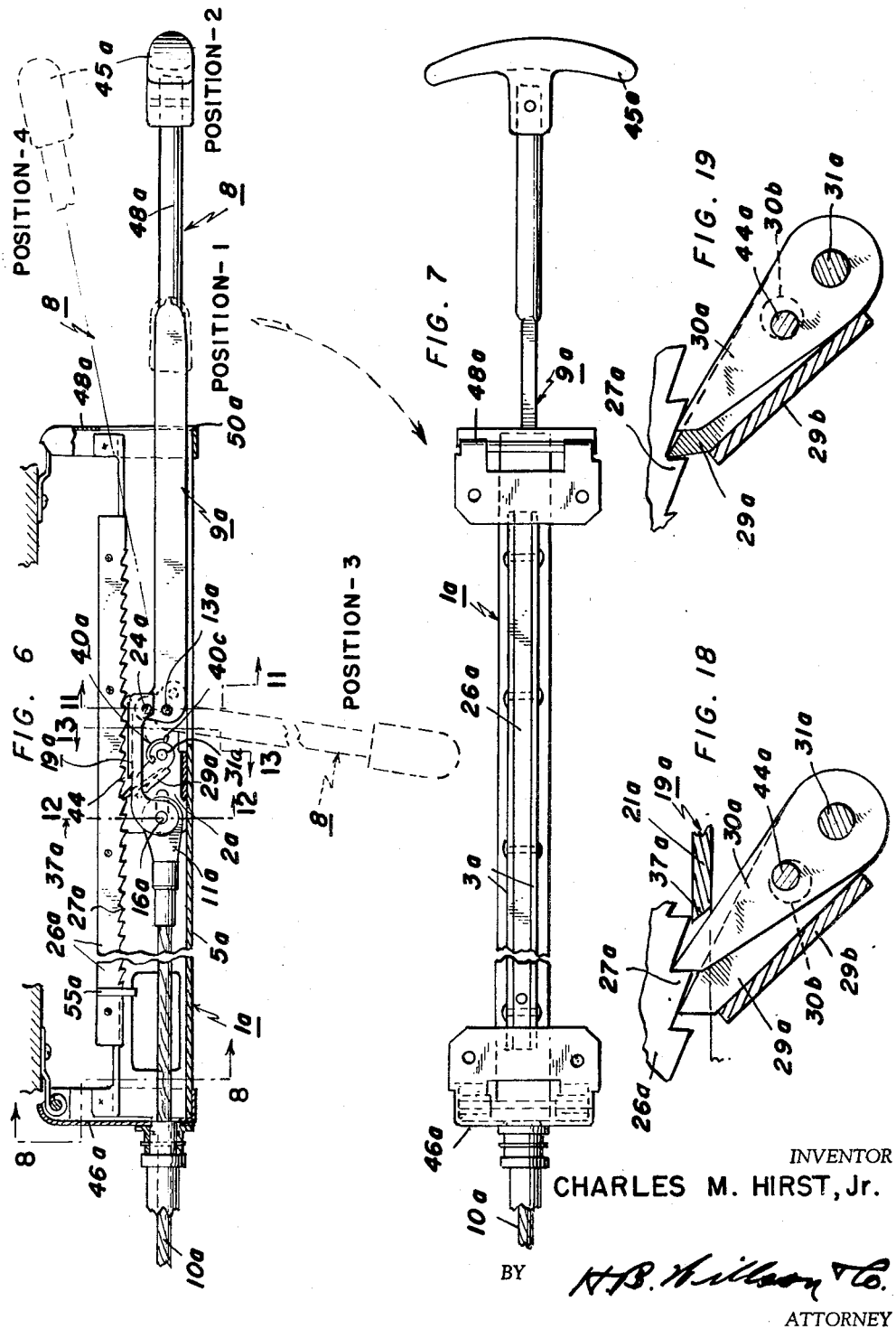

INVENTOR
CHARLES M. HIRST, Jr.

BY

ATTORNEYS

March 15, 1960  C. M. HIRST, JR  2,928,292
BRAKE OPERATING OR SIMILAR MECHANISM
Filed March 9, 1959  5 Sheets-Sheet 5
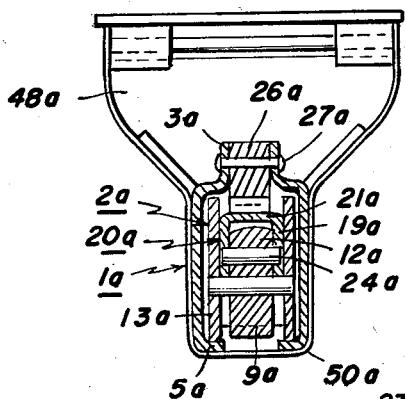
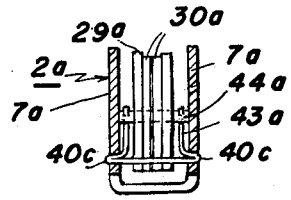
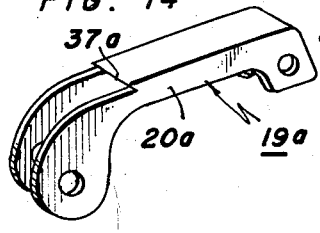
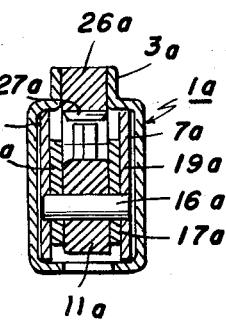
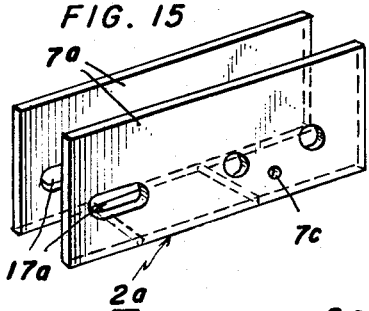
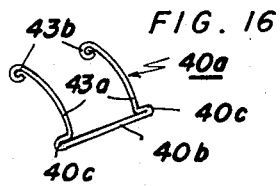
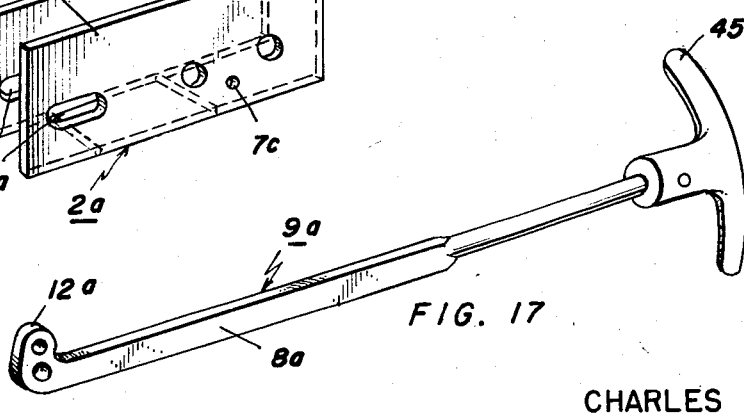
INVENTOR
CHARLES M. HIRST, Jr.
BY
ATTORNEY United States Patent Office 2,928,292
Patented Mar. 15, 1960

2,928,292

BRAKE OPERATING OR SIMILAR MECHANISM

Charles M. Hirst, Jr., Moberly, Mo., assignor to Orscheln Brake Lever Manufacturing Company, Moberly, Mo., a corporation of Missouri Application March 9, 1959, Serial No. 798,007

10 Claims. (Cl. 74—503)

This invention relates to control lever and linkage systems used in connection with vehicle brakes but capable of other uses. More particularly the invention relates to an actuating mechanism for parking, emergency and service brakes such as currently used in the automotive field.

In one type of motor vehicle brake mechanisms, pawl and ratchet means are used in connection with the brake actuator. In another type an over-center, toggle or cam type lever is used, as in two of the Albert Orscheln Patents Nos. 2,171,403, August 29, 1939 and 2,464,096, March 8, 1949. A distinct advantage of the pawl and ratchet lever type is the large amount of throw or travel given to the brake linkage, usually a rigid rod or flexible cable, while the primary disadvantage of an actuator of this nature is its relatively low mechanical advantage which varies from zero to approximately seven to one as a maximum. On the other hand, a lever of the cam type such as in the above Orscheln patents, is limited in its usage by a restricted amount of travel inherent in its nature, yet it has a high degree of mechanical advantage varying from zero to infinity. The present invention is a combination of these two types of actuating mechanisms since it combines the best features of both and eliminates the inherent disadvantages of each.

The invention contemplates a mechanism of this character in which a carriage is slidable on a body and has a connection with the brake linkage, load-actuating or other work-performing element that will permit limited movement of the element independent of the carriage, pawl and ratchet means associated with the carriage and the body for normally locking the carriage against return movement after it has given the element a primary stroke, and link and lever means between the carriage and the element including an angular lever pivoted to the carriage and having long and short arms and a link connecting the short arm and the element, the long arm being useable as a handle to pull the carriage during the primary stroke and being swingable in one direction from a normal position through an arc of more than 90° to cause the short arm and the link to give the element a secondary stroke independently of the carriage and to then lock the lever, there being coaction between the link and lever means and the pawl and ratchet means to release the latter when the long arm of the lever is swung in the opposite direction from the normal position.

The invention further contemplates the release of the pawl and ratchet means by the movement of either the lever or the link, and also means for resetting the pawl and ratchet means at the end of the return movement of the carriage.

One object is to provide a practical operating mechanism that combines the pawl and ratchet and the toggle type levers to provide a large stroke at a high mechanical advantage.

Another object of the invention is to provide a simple and effective actuating mechanism of the above indicated character which may be economically produced to meet the current needs of the automotive industry.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a vertical longitudinal sectional view through one embodiment of the control mechanism showing the carriage in full lines in an intermediate position and in dotted lines in its initial position;

Fig. 2 is a similar view of a portion of Fig. 1 on an enlarged scale showing the carriage in its initial or "brake-off" position;

Figure 8:
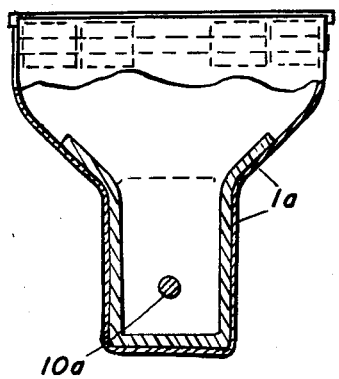
Figure 9:
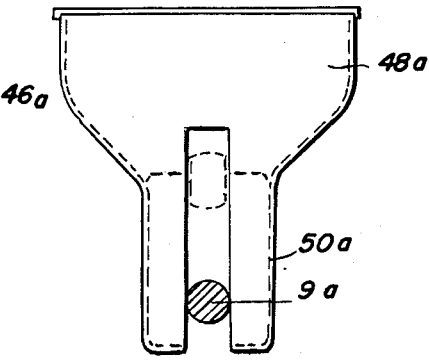
Figure 10:
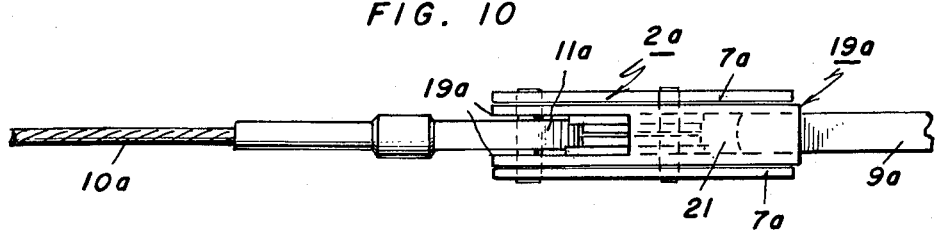

Figs. 3 and 4 are detail cross sectional views taken respectively on the lines 3—3 and 4—4 in Fig. 2;

Fig. 5 is an elevation of the front end of the housing, the lever being in cross section;

Fig. 5a is a perspective view of the link;

Fig. 6 is a vertical longitudinal section through a second embodiment of the invention, parts being broken away and the carriage being shown in an intermediate position;

Fig. 7 is a top plan view of the mechanism shown in Fig. 6;

Fig. 8 is a detail view partly in elevation and partly in section, the plane being indicated by the line 8—8 in Fig. 6;

Fig. 9 is an elevation of the front end of the mechanism, the lever being shown in section;

Fig. 10 is a detail top view of the link and carriage and portions of the lever and the cable;

Fig. 11 is a detail cross section taken on line 11 in Fig. 6;

Fig. 12 is a detail cross section through the body or housing taken on the line 12—12 in Fig. 6;

Fig. 13 is a detail cross section through the carriage, the plane of the section being indicated by the line 13—13 in Fig. 6;

Fig. 14 is a perspective view of the link;

Fig. 15 is a perspective view of the carriage;

Fig. 16 is a perspective view of the spring;

Fig. 17 is a perspective view of the lever;

Figs. 18 and 19 are detail views of the pivoted pawls; and

Figure 20:
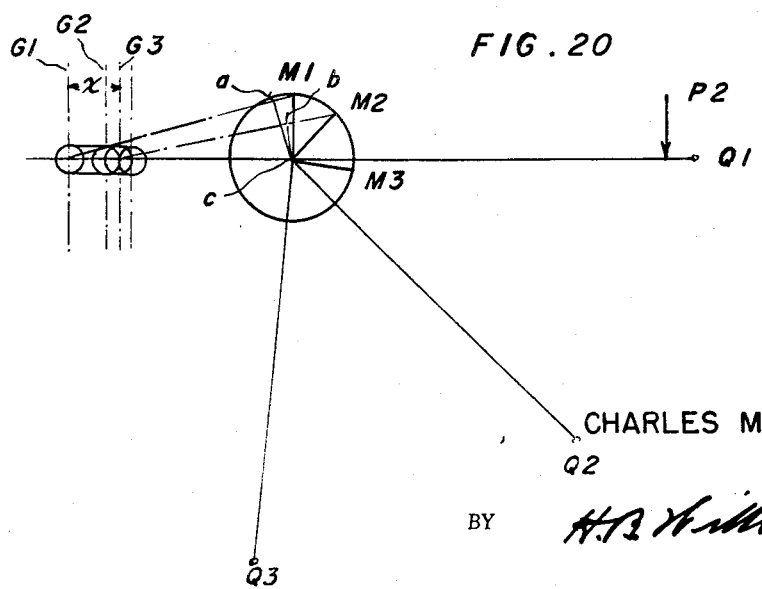

Fig. 20 is a diagram showing the increasing mechanical advantage obtained by swinging the lever through an arc in excess of 90°.

Referring to the first disclosed form of the invention the numeral 1 denotes a support in the form of a tubular metal body which forms a housing for a reciprocating slide or carriage 2. The supporting body is preferably of rectangular shape in cross section having a top wall 3, side walls 4 and a bottom wall 5 formed with a central longitudinal slot. The carriage 2 is an elongated metal member of U-shape in cross section having a bottom 6 to slide on the bottom 5 and parallel side walls or plates 7.

Extending from the front end of the body 3 is the long arm 8 of an actuating lever 9, and into its rear end extends a work-performing or load-actuating element 10, which when the mechanism is used for controlling an automotive emergency or parking brake, may be a rod or cable having an eye 11 at its end. The lever 9 is of angular form having a short arm 12 projecting radially from the lever fulcrum 13 and preferably at right angles to the long arm 8. The fulcrum 13 may be a transverse pivot pin 14 having its ends mounted in openings in the carriage side plates 7 adjacent their front ends. The carriage may thus be reciprocated in the body or housing by pulling and pushing the lever.

The load-actuating element 10 is connected to the carriage so that it will be pulled when the carriage is slid forwardly but the connection is such that it may have a further limited forward movement independent of the carriage. That is preferably accomplished by a transverse pin 16 in the eye 11, the ends of the pin being slidable in opposed longitudinally extending slots 17 formed in the carriage side plates 7. The element 10 is given a long primary stroke by a forward pull of the lever; and that further forward movement of the element is produced by a swinging movement of the lever because of a link member 19 between the element and the short arm 12 of the lever. When the lever is in its normal position, its long arm 8 extends forwardly or in the line of horizontal movement of the carriage and its short arm projects upwardly. The link 19 is preferably of channel-shape or inverted U-shape in cross section having side plates 20 connected by a short top plate 21 as seen in Figure 5a. The rear ends of the plates 20 form a forked portion which straddles the eye 11 and is supported on the pin 16. The lower edges of the plates 20 below the pivot 16 are preferably formed with downwardly-extending projections 22 which may slide on the bottom 6 of the carriage to support the linkage, as shown in Fig. 2. The forward ends of the link side plates 20 are vertically widened and form a forked portion which straddles the short arm 12 of the lever. The upper part of this forward forked portion is apertured to receive a transverse pivot pin 24 mounted in the arm 12 to provide the pivotal connection between the link 19 and the lever. The side plates of that forward end of the link are also formed with opposed arcuate slots 25 concentric with the lever fulcrum pin 13, the latter moving in the slots when the lever is swung.

The link and lever means 9—19 is between the element 10 and the slide or carriage 6, and some part of it is utilized to control a spring-actuated pawl and ratchet means associated with the carriage and with the body to lock the carriage as it is slid forwardly by a pull on the lever. In the first disclosed form that part is the short arm of the lever, while in the second disclosed form, it is the link, as presently described.

The pawl and ratchet means comprises a ratchet member, at least one pivoted pawl and at least one spring which is so constructed and arranged that it will hold the pawl in either ratchet-engaged or ratchet-disengaged position. The ratchet member 26 comprises a longitudinal row of ratchet teeth 27 extending in the direction of movement of the carriage and disposed above it. While the ratchet teeth may be on a bar fixed in the top of the body 1, they are shown in Fig. 2 as stamped in and integral with the wall 3. The pawl or pawls may be variously constructed but I preferably provide two 29 and 30 mounted on the same pivot 31 and having ratchet teeth engaging portions or projections 32 and 33 respectively at different distances from the pivot 31 so that they will successively engage the teeth 27. However each of these two pawls is shown as composed of two similar pawl plates welded to the opposite sides of a spacing washer 28 through which the pivot pin 31 also passes. The pawls are disposed between the upper portions of the side plates 7 of the carriage and the pivot pin 31 is mounted in these plates near the front end of the carriage. The pivot 31 is so located as to provide the pawls with short front end portions 36 which overlie the leveled or inclined top end 37 of the short arm 12 of the lever, and to provide long rear end portions 38 which have on their upper edges the projections 32 and 33 that coact with the teeth 27.

The spring or springs that control the positions of the pawls are made of resilient wire and are of substantially U-shape in profile. Each has a central portion bent to form an eye or loop from which extends two curved arms terminating in eyes. Since there are two pawls each having two spaced pawl plates, two springs 40 are provided and one arm 41 of each has its eye on an anchor pin 42 extending transversely between the carriage side plates 7. The other arm 43 of each spring has its eye disposed between the two plates of a pawl and mounted on a short pin 44 between those plates, as shown in Figs. 2 and 3. The springs are so constructed and arranged that when the pins 44 are above the horizontal center of the anchor pins 42 the springs will urge the pawls upwardly toward ratchet-engaging positions, and when the pins 44 are below the centers of the pins 42 the springs will hold the pawls in ratchet-disengaged positions with the beveled upper edges 45 of the short ends 36 of the pawls slidably bearing against the ratchet member.

To the front end of the long arm of the lever is suitably fixed a handle or hand-grip 45 preferably of the cross-bar type. When the mechanism is used on a motor vehicle, the rear of the body 1 may be supported by a bracket member 46 mounted on the fire wall or dash 47, and its front end supported by a bracket member 48 attached to the instrument panel 49. The bracket 48 extends upwardly from a front end closure 50 flanged to telescope over the end of the body 1. This closure cap 50 has a vertical slot 50¹ to receive the lever, the lower end of the slot being reduced in width as at 50². The major portion of the lever has flat side faces and a width slightly less than the reduced portion 50² of the slot. However a portion of the lever adjacent the hand-grip 45 is of circular shape in cross section as seen in Fig. 5, and the diameter of this portion is slightly less than the width of the upper and main portion of the slot 50¹, so that when the lever is in the position designated "Position 1," the round portion will be supported by the shoulders formed by the reduced slot portion 50². If desired a bent leaf spring 52 may be provided in the front end of the body to hold the lever under tension. When the parts are in such normal position, the handle may abut the cap, as shown in the dotted line position in Fig. 1 designated "Position 1." The full line position in Fig. 1 designated "Position 2" shows the position of the parts after the lever has been pulled forwardly to take up slack in the braking means and associated parts and to lightly apply the brakes. The lever is then swung downwardly to the dotted line position designated "Position 3" to set the brakes and lock the lever. As the lever swings through an arc of slightly more than 90° the short arm will move the link pivot 24 below the horizontal center of the lever fulcrum 13 and the link 19 will move the element through a short secondary stroke, the pin 16 moving in the slots 17 of the carriage which remains locked by the pawls. To release the brakes the lever is swung upwardly first to the normal position and then further upwardly to the dotted line position designated "Position 4." That movement causes the end 37 of the short arm to engage and lift the short ends 36 of the pawls to unlock the carriage so that the lever may be used to push it rearwardly in the housing. When the pawls 29 and 30 are moved to disengaged positions, the springs will hold them in such positions until the pawls are reset.

In order to reset the pawls I may provide at the rear of the housing a transversely extending rod or pin 55 so positioned that when the carriage is moved to its initial position, the pin will strike the rear arms 41 of the springs to cause their front arms to swing the pins 44 upwardly above the centers of the pins 42. Notches are formed in the rear edges of the carriage plates 7 to receive the reset element 55. While the carriage may be stopped at the end of its rearward travel by any suitable means, I preferably provide a similar cross bar or pin 56 in the housing for engagement by the side plates 7 of the carriage. The rear mounting bracket 46 may be bolted to the dash and have a projecting portion to fit in the rear end of the body and removably support the latter. In such projecting portion is suitably fastened a tubular conduit or compression member 57 usually used when the element 10 is a cable.

In the second form of the invention shown in Figs. 6 through 19 many parts are the same or substantially the same as those in the first form and such parts will bear the same numerals with exponents. The principal differences between the two forms reside in the construction of the pawl and ratchet means, the link, the body or housing and the pawl reset. The ratchet teeth 27$^a$ are formed on a ratchet bar 26$^a$ riveted between upstanding flanges 3$^a$ at the top of the body or housing 1$^a$. The latter is also of tubular form and of generally rectangular shape in cross section. The slide or carriage 2$^a$ slides on the bottom 5$^a$ of the housing, the bottom having at its front portion a central slot to permit the lever 9$^a$ to swing downwardly. As seen in Fig. 15 the carriage is U-shaped in cross section having side plates 7$^a$ connected by a short bottom. Near the rear these plates have opposed longitudinal slots 17$^a$ to receive the ends of the pin 16$^a$ which extends through the eye or clevis 11$^a$ at the end of the cable or other load-actuating element 10$^a$ and also through the downwardly extending forked rear arm of the link 19$^a$. The latter as seen in Fig. 14 is of inverted U-shape or horseshoe shape in profile and of channel shape in cross section. The short top plate 21$^a$ of the link connects the side plates or flanges 20$^a$, and at the front end of the link these flanges extend downwardly to form the front forked arm which straddles the short arm 12$^a$ of the angular lever and which pivots on the pin 24$^a$ in said arm. The long arm 8$^a$ of the lever carries the hand grip 45$^a$ and swings vertically on the pivot pin 13$^a$ which has its ends in openings in the carriage plates 7$^a$.

The preferred spring-controlled pawl means in this second form include two swinging pawls 29$^a$ and 30$^a$ of unequal length to successively engage the teeth 27$^a$, the two pawls being mounted on the same pivot pin 31$^a$ between the side plates 7$^a$ of the carriage. However each of these two pawls comprises two identical pawl plates. The two inner plates form the shorter pawl 30$^a$ and they are connected by a transverse pin 44$^a$ so that they swing in unison, but it is obvious that a single wider pawl plate may be used. The longer pawl 29$^a$ is formed by the two outer pawl plates and they may have their lower edges connected by a transverse plate 29$^b$ so that the two pawl plates swing in unison. The pawl connecting pin 44$^a$ has its projecting end disposed in openings 30$^b$ in the plates of the outer pawl 30$^a$, such openings being of greater diameter than the pin 44$^a$ so that the two pawls may have limited independent swinging movement, as will be understood on reference to Figs. 18 and 19. The pin 44$^a$ is disposed between the pivoted ends of the pawl 30$^a$ and their beveled free ends which coact with the ratchet teeth. The spring means which urges the pawls upwardly toward ratchet-engaged position acts on the pin 44$^a$, and it is preferably a single spring 40$^a$ made of resilient wire, as shown in Figs. 13 and 16. The spring has a straight central portion 40$^b$ with anchoring projections or studs 40$^c$ at its ends and with spaced parallel and longitudinally curved arms 43$^a$ projecting from it inwardly of said studs and formed at their ends with loops or eyes 43$^b$. The studs 40$^c$ are anchored in opposed holes 7$^c$ in the carriage side plates 7$^a$ and the spring arms 43$^a$ are disposed between the outer pawl or pawls and those side plates with their loops engaged with the projecting ends of the pawl connecting pin 44$^a$. The spring arms are tensioned to move the pin upwardly and thus lift the pawls. It will be noted that the relative location of the anchoring points 40$^c$ of the spring arms, the pawl pivot 31$^a$ and the pin 44$^a$ to which the arms are connected, is such that they are not in a straight line in Fig. 6. Hence when the pawls are swung downwardly the pin 44$^a$ will pass over the dead center of the pawl pivot 31$^a$, and the spring will then act to hold the pawls in ratchet-disengaged position until the pawls are reset. In this second form it is the link 19$^a$ which moves the pawls to their disengaged position rather than the lever as in the first form. As seen in Figs. 6 and 14, the top 21$^a$ of the link has its rear edge undercut or beveled as at 37$^a$ and disposed close to the pawls when they are in ratchet-engaged position so that upon rearward movement of the link, the part 37$^a$ will move the pawls to their disengaged position. The pawls will be reset or moved to ratchet-engaging position at the end of the return movement of the carriage by the pawls 29$^a$ striking a reset stop projection 55$^a$ which may depend from the rear portion of the ratchet bar 26$^a$. A suitable stop to limit rearward movement of the carriage may be provided in the housing.

The front end of the body or housing 1$^a$ may be closed by a flanged cap 50$^a$ having a slot for the lever and a widened upstanding bracket portion 48$^a$. A similar cap with an upstanding bracket 46$^a$ is telescoped over the rear end of the housing and has fastened to it the conduit or compression member through which the cable 10$^a$ extends. The two bracket portions have apertured attaching plates hinged to them to facilitate mounting of the housing.

In the operation of the second form, when the brakes are off, the carriage will be at the rear end of the housing, and the brake lever will be horizontal with its handle in the dotted line position designated "Position 1" in Fig. 6. When the brakes are to be applied the lever is first pulled straight out or forwardly to the full line position of the handle designated "Position 2." That moves the carriage to the position shown in Fig. 6 and as carriage moves the pawl and ratchet mechanism lock it. The lever is then swung downwardly through an arc of slightly more than 90°, such as 93°, to the position indicated by the broken line marked "Position 3." That swinging movement of the lever throws the link pivot 24$^a$ on its short arm over the dead center of the lever pivot 13$^a$ and locks the lever in "brake-on" position. That movement causes the link to be pulled forwardly a short distance causing the link part 37$^a$ to move away from the pawls and causing the link pin 16$^a$ to move the brake linkage or cable as the pin moves in the slots of the carriage. When the brakes are to be released, the lever is swung upwardly first to "Position 2" to restore the parts to their full line positions in Fig. 6, and then swung upwardly to the broken line designated "Position 4" in Fig. 6. As the lever swings above the horizontal the link pin 24$^a$ on its short arm moves the link rearwardly so that its part 37$^a$ engages and moves the pawls out of engagement with the ratchet throwing the pawl connecting pin 44$^a$ past the dead center of the pawl pivot 31$^a$ so that the pawls will be held in their disengaged position. The lever is then pushed rearwardly to its normal "brake-off" position, that is, to "Position 1." During the latter operation the longer pawls will strike the reset 55$^a$ to cause the pawls to snap upwardly and be in ratchet engaging position for the next cycle of operation.

It is to be noted that the application of the primary force, the pulling of the lever, gives a long stroke of the carriage and hence the cable, at a relatively low mechanical advantage; and that the application of the secondary force, the rotation of the lever, provides the additional travel, indicated at X in Fig. 20, of the carriage and cable, at a constantly increasing mechanical advantage. Further the rotation of the pin 24$^a$ through an arc of more than 90° locks the lever without further load being applied to it.

The diagram of Fig. 20 will make clear the power strokes. It is a schematic diagram in which $G^1$, $G^2$ and $G^3$ represents different positions of the pin 16 in Fig. 1 or 16$^a$ in Fig. 6; $M^1$, $M^2$ and $M^3$ represent the pin 24 or 24$^a$; and $Q^1$, $Q^2$ and $Q^3$ represent the handle of the lever. The letter $c$ in Fig. 20 represents the pin 13 or 13$^a$, the center of rotation of the hand lever. The point $a$ establishes a line $a$—$c$ that is perpendicular to an imaginary line between the pivot pin 24 or 24$^a$ and the pin 16 or 16$^a$ that connects the load 10 or 10ª to the slide or carriage. This perpendicular distance a—c enables me to establish a mechanical advantage by using the measured or calculated length of the line a—c as a numerator, and the measured or calculated length of the line c—Q' as a denominator in the formula Mech. Adv.=a—c/c—Q'. Progressively it can be seen by studying the force diagram Fig. 20, that the perpendicular distance a—c reduces in length to zero, as the hand lever is moved from its horizontal position through $Q^2$ to $Q^3$, that is, from brake unapplied to brake applied position. The letter b establishes a point similar to a at an intermediate position, and by substituting the line c—b in the formula, in lieu of c—a, the mechanical advantage can be computed and will show progressively an increase to infinity. From the initial position $G^1$, $M^1$ and $Q^1$ the mechanical advantage is the ratio of the lever arm c—$Q^1$ as a numerator to perpendicular distance a—c as a denominator. By moving $Q^1$ to $Q^2$ it can be seen that the mechanical advantage is now the ratio of c—$Q^2$ as a numerator to the perpendicular c—b as a denominator. With c—b being smaller than the perpendicular distance a—c the mechanical advantage is greater as this follows an elliptical curve approaching infinity when points $G^1$, c and M are in a single horizontal plane. By continuing motion of the hand lever from $Q^2$ to $Q^3$ we have toggled oven center causing link 19 or 19ª to come in contact with pivot 13 or 13ª requiring no further handle effort to keep in locked position.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In combination, mechanism control including a body, a slide reciprocable thereon, pawl and ratchet means associated with said body and said slide to normally latch the slide, a movable load-actuating element connected to said slide for limited movement independent of said slide when the latter is latched, and link and lever means between said slide and said element, the last mentioned means including a link and a lever, the latter being pivoted to said slide and the link being pivoted to said lever and to said element, said link and lever means coacting with said pawl and ratchet means to unlatch said slide.

2. In combination, mechanism control including a body, a slide reciprocable thereon, a ratchet member having a row of teeth extending in the direction of movement of the slide, a movable load-actuating element, means connecting said element to said slide for limited movement independent of the slide, spring-actuated pawl means on said slide to coact with said ratchet teeth to normally latch the slide, and link and lever means between said slide and said element, the last mentioned means including a link and an angular lever, the latter being pivoted to said slide and having a short arm, said link being pivoted to said short arm and to said element, said link and lever means and said spring-actuated pawl means having coacting parts to unlatch said slide.

3. In combination, mechanism control including a supporting body; a slidable carriage mounted to reciprocate thereon; a movable load-actuating element; means connecting said element to said carriage for limited movement independent of the carriage and in the direction of its travel; spring-actuated pawl and ratchet means associated with said carriage and said body, the last mentioned means including a row of ratchet teeth on the body extending in the direction of travel of the carriage, at least one pawl pivoted on the carriage to coact with said teeth to normally latch the carriage against return movement after it has been moved to give said element a primary stroke, and spring means associated with said pivoted pawl and said carriage to hold said pawl in either ratchet-engaged or ratchet-disengaged position; and link and lever means associated with said element and said carriage and comprising a link and an angular actuating lever, the lever being pivoted to said carriage and having a long arm and a short arm, said link having a connection to said element and to said short arm, said long arm being swingable in one direction from a normal position through an arc sufficient to lock the lever after the link and short arm have moved the element through a secondary stroke while said carriage is latched by said pawl being in ratchet-engaged position; the said link and lever means coacting with the said spring-actuated pawl and ratchet means to move said pivoted pawl to ratchet-disengaged position when said long arm is swung in the opposite direction from its normal position.

4. The combination of claim 3 in which said element has an eye at its end, said carriage has elongated side plates formed with opposed longitudinal slots, said link is disposed between the side plates of the carriage and has at one end a forked portion which straddles said eye, and a pin passing through said eye and said forked portion and having its ends slidable in said slots to provide the said means connecting said element to said carriage for limited movement and the said connection between said link and said element.

5. The combination of claim 3 together with a pawl-reset element associated with said body and coacting with said spring-actuated pawl and ratchet means to cause said pivoted pawl to be moved from its ratchet-disengaged position at the end of the return movement of the carriage.

6. The combination of claim 3 in which said pivoted pawl is pivoted between its ends and has a ratchet tooth engaging portion at one side of its pivot, and in which the short arm of the lever engages the pawl on the other side of its pivot to cause the pawl to be moved to ratchet-disengaged position when the long arm of the lever is swung in said opposite direction.

7. The combination of claim 6 in which the said spring means of said spring-actuated pawl and ratchet means includes a substantially U-shaped spring with one of its two arms anchored to said carriage and its other arm anchored to the ratchet tooth engaging portion of said pivoted pawl, the spring being so connected and arranged that it will hold the pawl in either of its two positions, and a pawl-reset element associated with said body and coacting with said spring to cause the pivoted pawl to be moved from ratchet-disengaged position at the end of the return movement of the carriage.

8. The combination of claim 6 in which said body is a horizontally disposed tubular housing and said long arm of the lever in its normal position projects from one end of the housing, a closure for said one end of the housing formed with a slot to permit the swinging of the lever in a downward direction, and coacting means on said cap and said lever for supporting its long arm in said normal position.

9. The combination of claim 3 in which said link has a portion which coacts with the pivoted pawl of said spring-actuated pawl and ratchet means to cause said pawl to be moved to ratchet-disengaged position when the long arm of the lever is swung in said opposite direction.

10. The combination of claim 3 in which said link is of U-shape and has two arms at the ends of an intermediate portion, one of said link arms being pivoted to the short arm of said lever, and the other of said link arms being pivoted to said element, the intermediate portion of said link coacting with said pivoted pawl to cause the latter to be moved to ratchet-disengaged position when the long arm of the lever is swung in said opposite direction.

No references cited.